United States Patent [19]

Tripp et al.

[11] Patent Number: 4,658,319

[45] Date of Patent: Apr. 14, 1987

[54] TIME LAPSE VIDEO RECORDER WITH AUTO MONITORING FUNCTION

[75] Inventors: Robert R. Tripp, Orange; Charles H. Watts, Huntington Beach, both of Calif.

[73] Assignee: Odetics, Inc., Anaheim, Calif.

[21] Appl. No.: 662,495

[22] Filed: Oct. 18, 1984

[51] Int. Cl.⁴ .................................................. H04N 5/782
[52] U.S. Cl. ..................................... 360/11.1; 360/33.1
[58] Field of Search ................... 360/10.1, 10.2, 10.3, 360/11.1, 14.1, 14.2, 14.3, 33.1, 35.1, 64; 358/906, 105, 10, 139

[56] References Cited

U.S. PATENT DOCUMENTS 3,761,910  9/1973  Vidovic ............................... 358/105
4,007,490  2/1977  Shoda .................................. 360/33.1
4,532,558  7/1985  Oota et al. ........................... 360/35.1

*Primary Examiner*—Donald McElheny, Jr.
*Attorney, Agent, or Firm*—Spensley, Horn, Jubas & Lubitz

[57] ABSTRACT

A time lapse video recorder includes auto monitoring circuitry for ensuring that proper recordings are being made. During the time between intermittent recording of fields by the time lapse recorder, the recorder is switched to a read mode of operation and the previously recorded field is monitored. If the monitored signal is of improper amplitude or frequency, an error detector activates an alarm. The invention may also be used with non-time lapse recorders to enable the quality of a recording to be checked without requiring rewinding of tape.

10 Claims, 10 Drawing Figures

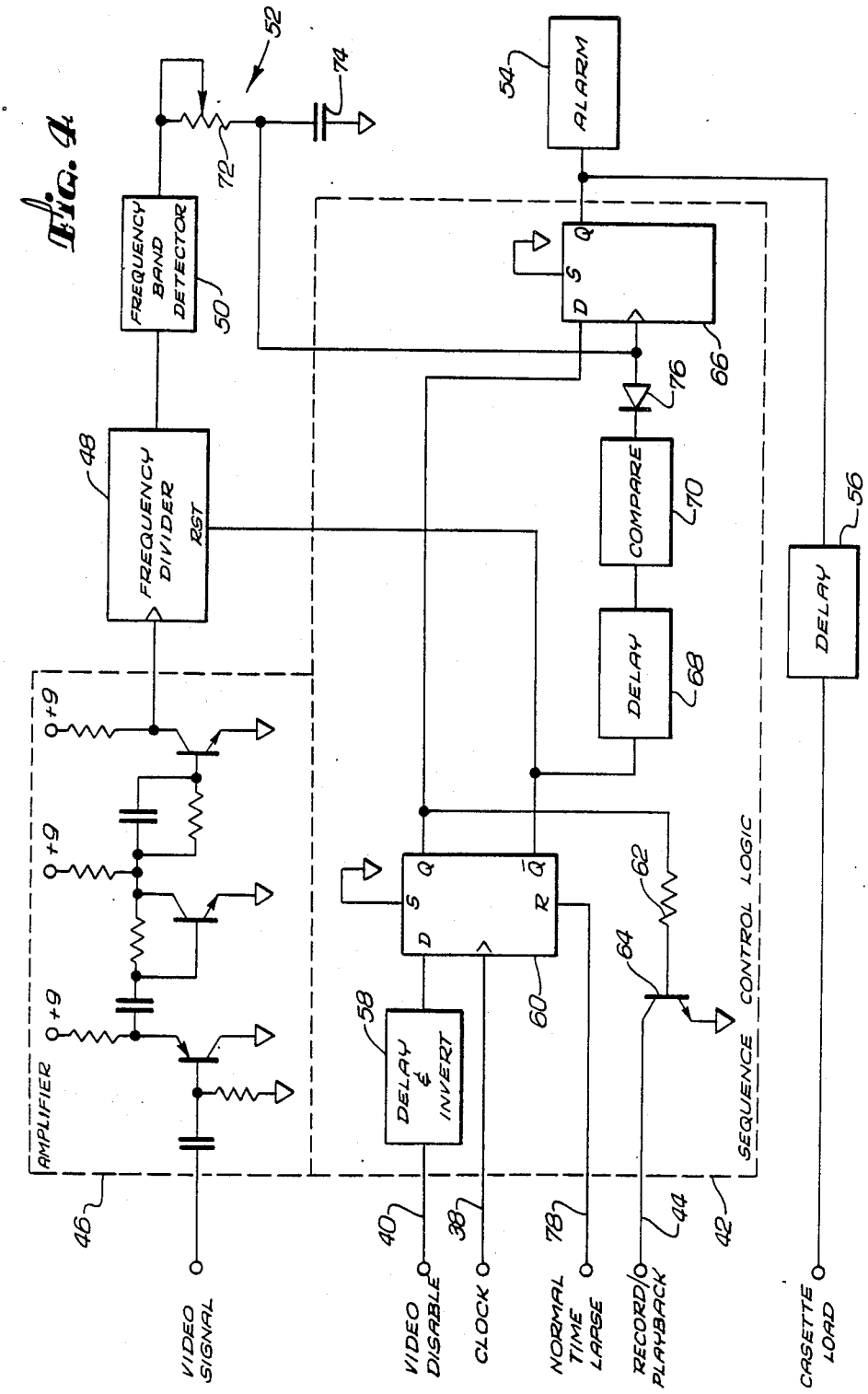

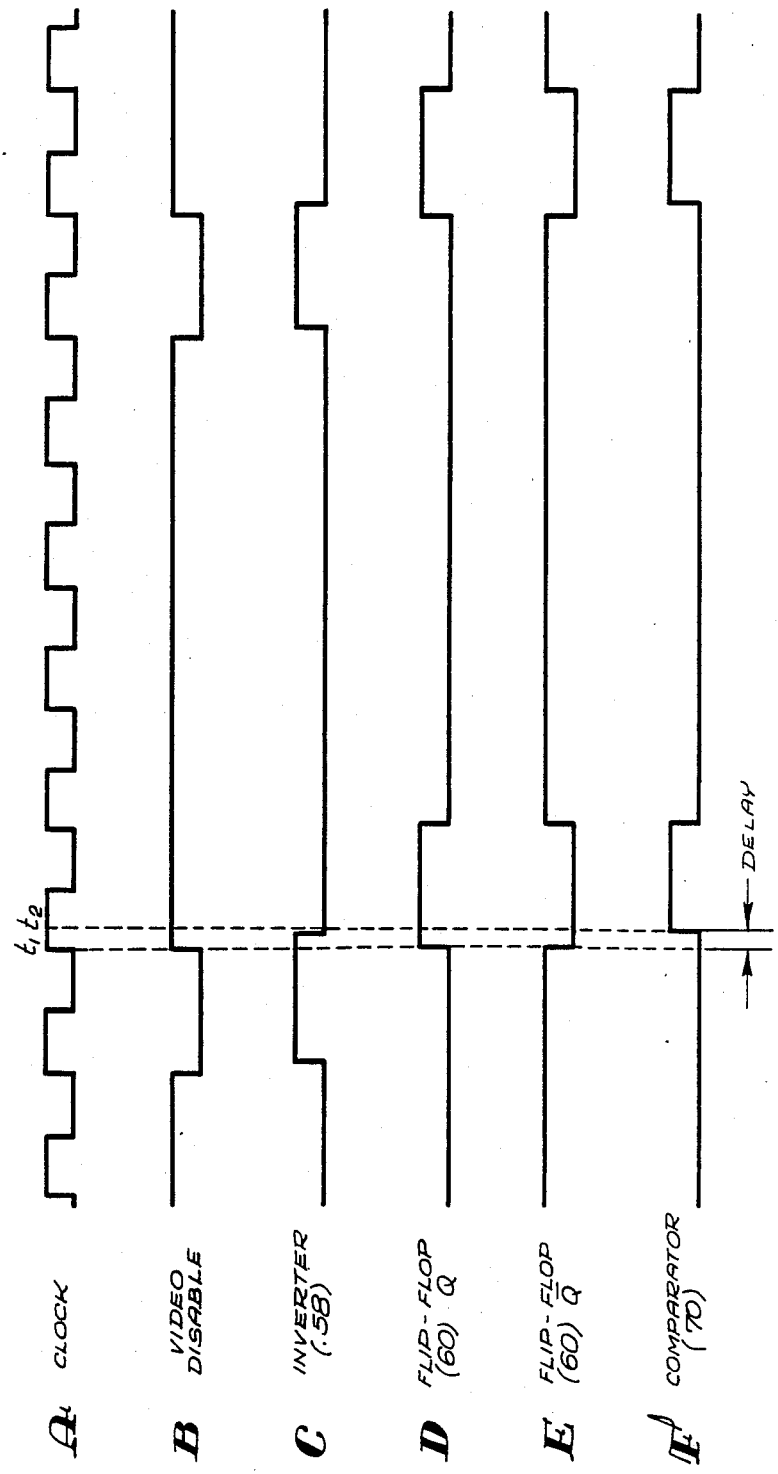

TIME LAPSE VIDEO RECORDER WITH AUTO MONITORING FUNCTION

BACKGROUND OF THE INVENTION

1. Field of the Invention

The present invention relates to video recorders, and more particularly to time lapse video tape recorders. Still more particularly, the present invention relates to a time lapse video recorder which includes a monitoring function to ensure that proper signals are being recorded.

In a normal video recorder a continuous stream of video pictures, or fields, is recorded using the helical scan technique. The basic recording configuration is illustrated in FIG. 1. A cylindrical head assembly 10 includes a pair of diametrically opposed video heads 12 and 14. The heads rotate in a direction indicated by an arrow 16, and a moving tape 18 is wrapped around the head assembly in a spiral fashion. The bottom of the tape is thus positioned adjacent to the head path at point A and the top of the tape is positioned adjacent the head path at point B. As a result, video signals are recorded in a diagonal fashion across the tape as illustrated at 20. The direction of tape, travel is indicated by an arrow 22.

The rotating heads are locked to the vertical sync of the video signal such that one diagonal track represents one field. For NTSC systems the heads rotate at 30 rps (1800 rpm). The result is that one complete revolution of the head cylinder will record a complete frame (two fields) of video information, with each adjacent track being recorded by an alternate head, as illustrated in FIG. 2. Thus, tracks 24 will be recorded by head 12 and tracks 26 recorded by head 14. The linear tape speed is selected so that the video tracks are as close together as possible to avoid unrecorded tape without cross-talk between adjacent tracks.

In time lapse recording, the machine does not record every field but rather periodically records fields on tape that is moving at a correspondingly slower speed. For example, in standard NTSC recording, sixty fields per second are recorded. For time lapse video recording having a 6:1 ratio every sixth field would be recorded (ten fields per second) and the tape slowed so that the track spacing remains the same. The coordinated reduction of speed and selective field recording preserves the normal speed format on the tape.

2. Description of the Prior Art

Video recorders are often used in security applications such as the monitoring of a bank or a store. It is therefore important that proper video recordings be made. On the other hand, time lapse recorders are typically intended to be operated unattended for long periods of time. Over these time periods, the video recorder may fail and proper recordings will not be obtained. Failure of the recorder can be caused by many different factors, including oxide buildup on the heads, worn heads, bad spots on the video tape and poor head/tape contact. In addition, tampering with the system, covering or painting the camera lens or cutting the connection between the camera and recorder will prevent proper recordings from being made.

SUMMARY OF THE INVENTION

It is a primary purpose of the present invention to provide a time lapse video recorder which monitors the time lapse recordings to ensure that proper recordings are being made. This is accomplished by providing a system in which the "dead" time between the periodic recording of fields is advantageously employed to monitor the previously recorded field. After a field is recorded, the recorder is quickly switched to a read mode of operation and the just recorded field is monitored to determine if the recording was properly made. In the preferred embodiment, one head records the field, the recorder is immediately switched to the read mode and the second head monitors the just recorded field on its next pass. Because of the slow tape speed, the second head can read the recorded signal without any difficulty, i.e., it will traverse essentially the same path across the tape as the first head did during recording. During the read operation, the signal is monitored to ensure that it has both the proper amplitude and frequency content. If an error is detected, an alarm is activated. After the monitoring process, the recorder is again returned to the record mode for the recording of the next field in the time lapse sequence.

The invention may also be employed in a non-time lapse recorder as a means of manually verifying that the recorder is properly recording without having to rewind the tape and play the recording. This is accomplished by momentarily placing the recorder in a pause mode and allowing the recorder to read the last recorded field prior to resumption of recording.

DESCRIPTION OF THE DRAWINGS

The invention will be described with reference to the accompanying drawings wherein:

FIG. 4 is a partial block, partial schematic diagram of the auto monitoring circuitry of the present invention; and FIGS. 5A-F are timing diagrams associated with the circuit of FIG. 4.

DESCRIPTION OF THE PREFERRED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

Figure 2:
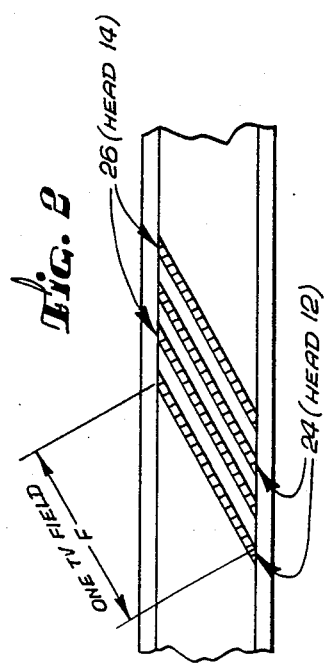
FIG. 2 is a plan view of a portion of a video tape illustrating the recording of tracks on the tape.
Figure 1:
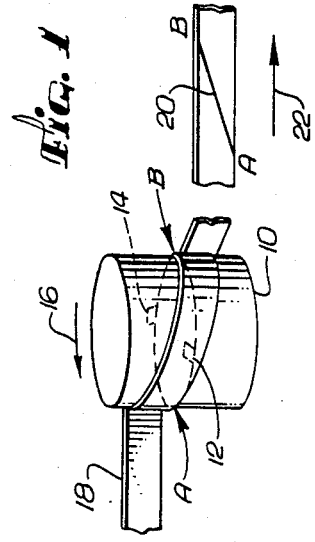
FIG. 1 is a perspective view of a head assembly and magnetic tape looped around the head assembly.
Figure 3:
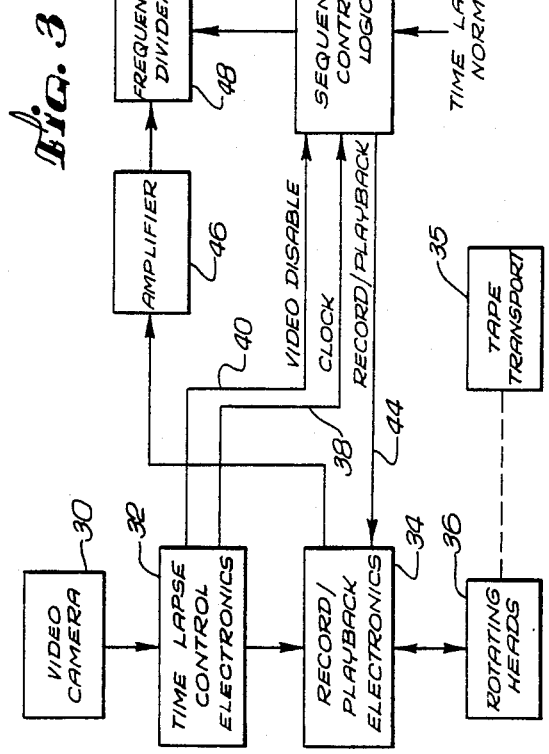
FIG. 3 is a block diagram of the present invention.

Referring to FIG. 3, camera 30 provides video signals at a rate of sixty fields per second (for NTSC) to time lapse control electronics 32. The time lapse electronics 32 provide signals to record playback electronics 34 on an intermittent basis so as to periodically supply signals corresponding to fields to a head assembly 36. A tape transport 35 moves a video tape with respect to the head assembly. The head assembly includes a pair of rotating heads which traverse a circular path as illustrated in FIG. 1. The head rotation is controlled so as to be locked in phase with the transmission of fields from the camera. The elements 30-36 are all conventional and need not be described in detail.

A video tape (typically contained in a video cassette) is passed by the head assembly 36 at a speed corresponding to the time lapse ratio. For example, if a 6:1 ratio is applied, the time lapse control electronics 32 will supply a field signal to the record/playback electronics 34 corresponding to every sixth field. Thus, every sixth field will be recorded, and the tape motion is slowed by a corresponding amount so that the field tracks are recorded closely adjacent to each other. In this fashion, a cassette which contains enough tape for two hours of normal recording would provide 12 hours of time lapse recording.

During the time period between the recording of fields, the recorder is essentially not in use. This "dead" time is employed in the present invention to achieve auto monitoring. The time lapse control electronics 32 provides a clock signal on line 38 corresponding to the field rate, with the clock occurring at the beginning of each field. The time lapse electronics also produces a video disable signal on line 40 which is derived from the clock signal switches from high to low during the time period in which a field is to be recorded. These signals are employed by a sequence control logic 42 to switch the video recorder from the record mode to a read mode after the recording of a field for the purposes of monitoring. The record/read switching is controlled via a signal on line 44. The read mode is a modified playback mode in which only certain circuits in the recorder are switched to the playback mode.

During the monitoring operation, the just recorded field is read by the head assembly 36 and supplied via the record/playback electronics 34 to an amplifier 46. The output of the amplifier is applied to a frequency divider 48, which in turn provides its output to a tone decoder or frequency band detector 50. The output of the frequency band detector drives an error detector 52 which outputs a signal to an alarm 54 in the event an error is detected. A delay 56 is provided to prevent operation of the error detector for a short time period (approximately 6–8 seconds) after the recorder is placed in the record mode to allow the circuit to stabilize.

The system of the present invention operates to monitor both the amplitude of the recorded signal as well as the frequency of the recorded signal. The amplifier 46 has a predetermined gain and, if the video signal which is read is within the proper amplitude range, the output of the amplifier 46 will be sufficient to drive the frequency divider 48. However, if the amplitude of the recorded signal is insufficient, it will fail to drive the frequency divider in accordance with the frequency of the video signal, with the result being that the output of the frequency divider will not be within a range corresponding to the video signal (after division). The frequency band detector 50 detects that the signal is out of the desired frequency range and drives the error detector 52.

In a similar fashion, if the video signal being monitored has an improper frequency content (which may occur, for example, if the camera lens is covered) the frequency band detector 50 will detect that the output of the frequency divider is not within the desired range and will drive the error detector 52.

The operation of the invention will be described in more detail with reference to FIGS. 4 and 5. The clock signal 38 is illustrated in FIG. 5A and goes high at the beginning of each field. The video disable signal 40 is illustrated in FIG. 5B and is derived from the clock signal. In the example shown, the video disable signal is generated every sixth clock, corresponding to a 6:1 time lapse ratio. The video disable signal goes low during the time period corresponding to a field to be recorded. Thus, when the time lapse control electronics 32 provides the video signal to the record/playback electronics 34 it also provides the video disable signal 40 to the sequence control logic 42.

The video disable signal is delayed and inverted by a bipolar junction transistor inverter and delay network 58. This delay is very brief and is provided to ensure that the video disable signal will lag slightly behind the clock signal. The output of the inverter 58 is illustrated in FIG. 5C. This output is applied to the D input of a flip-flop 60 which is clocked by the clock signal on line 38. The output of the flip-flop 60 will go high at a time t1 corresponding to the first clock pulse after the data input goes high, i.e., when the video disable signal again goes high after the recording of a field. The Q output of the flip-flop 60 is illustrated in FIG. 5D. This output will remain high until the next clock pulse, at which time it will go low since the data input has returned to a low level. The Q output drives an output transistor 64 via a resistor 62 to provide the record/playback control signal on line 44. Thus, the transistor 64 will switch, calling for a read mode, for a period equal to one clock pulse (i.e., one field) immediately following the recording of a field. The switching to the playback mode corresponds to one-half of a complete rotation of a head assembly immediately following the recording of a field. Therefore, one head will record a field and the other head is employed immediately thereafter to monitor the recorded field. The tape motion is slow enough so that the head will be substantially properly positioned with respect to the recorded track during the playback of the track.

The Q output of the flip-flop 60 is also provided as the data input to the second flip-flop 66. The output of the flip-flop 66 is the error signal which drives the alarm 54. The provision of the Q output of the flip-flop 60 as the data input to the flip-flop 66 ensures that a positive output from the flip-flop 66 indicating a bad recording can only occur during the read (monitoring) period, since at all other times the data input is low.

The complementary output of the flip-flop 60, illustrated in FIG. 5E, is delayed by a small predetermined amount of time by an RC delay 68 and then applied to a comparator 70. The output of the comparator 70 will thus go high a short period of time after the switching of the flip-flop 60, as illustrated in FIG. 5F. The output of the comparator 70 enables the error detector 52 as will be described subsequently. The delay allows any transients resulting from switching from recording to read to die down before the error detection becomes operative.

The amplifier 46 is a small signal video amplifier which operates to boost the approximately 50–150 millivolt signal up to an acceptable threshold level to drive the frequency divider 48. The video signal will lie in the range of 3.5–4.2 mHz, and the frequency divider is set up as a divide by sixty-two divider. Therefore, the output of the frequency divider should be approximately 60 kHz± about 20 kHz. If the amplitude of the video signal is below an acceptable level, the output of the amplifier 46 will be insufficient to drive the frequency divider 48 on each swing of the output signal, with the result being that the output frequency of the frequency divider will not be within the desired range. Similarly, even if the amplitude of the video input signal is sufficient, its frequency may not be proper, with the result again being that the output of the frequency divider 48 will not be within a desired range. It should be noted that the frequency divider 48 is held in a reset state at all times other than the read time by means of the complementary output of the flip-flop 60.

The output of the frequency divider 48 is applied as the input to the frequency band detector 50, which in the present embodiment of the invention is a National Semiconductor Model LM567 integrated circuit. Such frequency band detectors are well known in the art and provide an adjustable frequency band to which it is sensitive. If a signal of the desired frequency is applied to the input of the frequency band detector for a sufficient time period known as the capture time, the output of the detector will be low as long as the frequency of the input signal stays within the desired band. The frequency band can be adjusted as a function of the typical frequency content of the area to be monitored. If the frequency of the input signal to the frequency band detector is outside of the desired range, the output of the detector will go high, thus indicating either an insufficient amplitude or improper frequency of the recorded signal.

The error detector 52 is comprised of an RC charge pump having an adjustable potentiometer 72 and a capacitor 74. The capacitor 74 is maintained grounded via a diode 76 and the comparator 70 until a time t2 when the comparator switches from a low level to a high level. This removes the ground condition from the capacitor 74 and enables it to be charged. If a positive signal appears at the output of the frequency band detector 50 (indicating an error) the capacitor will be charged up. If the capacitor charges to a sufficient level, it will clock the flip-flop 66, thus causing its output to go high so as to drive the alarm 54. The charge pump 52 integrates the signal from the frequency band detector 50 and is adjustable to control the sensitivity at which the flip-flop 66 is clocked. Typically, the potentiometer 72 will be set at a level such that the capacitor 74 will be sufficiently charged to clock the flip-flop 66 if 25% of the field being monitored is bad. However, the sensitivity can be decreased in the event that the picture quality requirements are not as critical.

A time lapse recorder is typically operable in either the normal or time lapse mode of operation. In the event that the recorder is operated in the normal mode, no dead zone exists for the monitoring operation. Operation of the error detector in this situation is inhibited by a signal on line 78 which maintains the flip-flop 60 reset.

When the recorder is first started recording in the time lapse mode, it may take some time for the electronics to settle down. The delay 56 is provided to inhibit the operation of the alarm for a predetermined period after the initiation of recording, typically about six to eight seconds.

In summary, the present invention provides a system which automatically monitors signals recorded during time lapse recording on a video cassette recorder so as to ensure that proper recordings are being made. The system in no way interferes with the standard time lapse operation and can be easily incorporated into a time lapse recorder.

It should be noted that the invention may also be employed in a non-time lapse recorder, i.e., one in which each successive field is recorded. In order to check the quality of a recording, the transport would be stopped during the recording operation by placing the recorder in a pause mode. The single field read operation as described above would then be performed prior to resumption of recording. In this fashion, the field recorded just prior to stopping of the tape will be monitored. Thus the quality of a recording may periodically be checked without having to rewind the tape and view the picture.

What is claimed is:
1. A time lapse video recorder comprising:
   record/playback electronics switchable to enable recording of video signals or playback of previously recorded video signals;
   time lapse control circuitry for causing the record/playback electronics to intermittently record video signals at predetermined intervals; and
   automatic monitoring circuitry for switching the record/playback electronics to a read mode between successive recording intervals and monitoring the signal recorded in the immediately preceding recording interval to determine whether the signal was properly recorded, wherein the recorder is a helical scan videotape recorder having a pair of diametrically opposed rotating heads, wherein a track is recorded diagonally across a videotape during a recording interval corresponding to one-half of a complete head rotation, wherein the monitoring circuitry monitors the recorded track prior to the recording of a subsequent track, and wherein the monitoring circuitry includes means for monitoring the frequency content of the recorded signal to determine if it falls within an acceptable range.

2. A time lapse video recorder according to claim 1 wherein the monitoring circuitry monitors each recorded track during a time period corresponding to one-half of a complete head rotation immediately following the recording of a track, hereby one head is used for recording of a track and the other head is used for monitoring of the track.

3. A time lapse video recorder as in claim 1 wherein the monitoring circuitry includes means for monitoring the amplitude of the recorded signal to determine if it falls within an acceptable range.

4. A time lapse video recorder as in claim 3 wherein the monitoring circuitry includes means for monitoring the frequency content of the recorded signal to determine if it falls within an acceptable range.

5. A time lapse video recorder as in claim 1 wherein the means for monitoring the frequency content includes a frequency band detector.

6. A time lapse video recorder as in claim 5 further including a frequency divider whose output is connected to the frequency band detector, wherein the frequency divider is clocked by the signal being monitored, wherein if the signal being monitored is below a predetermined amplitude it will fail to clock the frequency divider, resulting in the absence of an input of the proper frequency to the frequency band detector.

7. A time lapse videotape recorder, comprising:
   a head assembly including a pair of diametrically opposed rotating heads;
   recording means for intermittently recording video fields on a videotape which moves past the head assembly, wherein each field is recorded by a head during one-half of a complete head rotation;
   playback means for reading signals recorded on the videotape; and
   monitoring means for switching the recorder from a recording mode to a read mode following the recording of a field and, prior to the recording of a subsequent field, monitoring the just recorded field to determine whether the field was properly recorded, wherein the monitoring means includes logic means for switching to the read mode immediately following the recording of a field, whereby a field recorded by one head during one-half of a complete rotation of the head will be monitored by the other head during the next half of a complete rotation of the heads, wherein the monitoring means includes means for monitoring the frequency content of the field recorded on the videotape.

8. A time lapse recorder according to claim 7 wherein the monitoring means includes means for monitoring both the amplitude and frequency content of the field recorded on the videotape.

9. A time lapse recorder according to claim 8 wherein the monitoring means includes:

a frequency divider which receives a read signal of the monitored field as an input signal, wherein if the read signal has an insufficient amplitude it will not properly activate the frequency divider, thereby resulting in an output signal from the frequency divider of a frequency which does not correspond to a desired frequency, and wherein if the read signal is of improper frequency content, the output signal of the frequency divider will be of a frequency which does not correspond to a desired frequency; and a frequency band detector which receives the output of the frequency divider, said detector providing a first output signal if its input is within a desired frequency range and a second output signal if its input is not within a desired frequency range.

10. A time lapse recorder according to claim 9 further including:

a charge pump which is charged upon the application of the second output signal, said charging device being enabled by the logic means only during the read mode and discharged at the end of each read mode; and and output device which provides an error signal when the charge on the charge pump exceeds a predetermined level.

* * * * *